US 9,125,225 B2

(12) United States Patent
Kadel

(10) Patent No.: US 9,125,225 B2
(45) Date of Patent: Sep. 1, 2015

(54) METHOD AND SYSTEM FOR PROACTIVE AND DYNAMIC CROSS-LAYER OPTIMIZATION OF DATA TRANSMISSION TO VEHICLES

(75) Inventor: Gerhard Kadel, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 230 days.

(21) Appl. No.: 13/551,679

(22) Filed: Jul. 18, 2012

(65) Prior Publication Data
US 2013/0035083 A1 Feb. 7, 2013

(30) Foreign Application Priority Data

Aug. 4, 2011 (EP) .................................... 11176576

(51) Int. Cl.
*H04W 84/00* (2009.01)
*H04W 16/22* (2009.01)
(52) U.S. Cl.
CPC ............ *H04W 84/005* (2013.01); *H04W 16/22* (2013.01)
(58) Field of Classification Search
CPC .................. H04W 4/02; H04W 4/021–4/028; H04W 4/04; H04W 28/08–28/26
See application file for complete search history.

(56) References Cited

U.S. PATENT DOCUMENTS

| 7,558,603 | B2 | 7/2009 | Kadel et al. | |
|---|---|---|---|---|
| 2007/0230399 | A1* | 10/2007 | Oswal et al. | 370/331 |
| 2010/0214923 | A1* | 8/2010 | Vivanco et al. | 370/235 |
| 2011/0310865 | A1* | 12/2011 | Kennedy et al. | 370/338 |
| 2012/0064908 | A1* | 3/2012 | Fox et al. | 455/452.2 |
| 2012/0117240 | A1* | 5/2012 | Omar | 709/226 |
| 2012/0157106 | A1* | 6/2012 | Wang et al. | 455/446 |

FOREIGN PATENT DOCUMENTS

| EP | 1206153 A1 | 5/2002 |
|---|---|---|
| WO | WO 9522210 A2 | 8/1995 |

* cited by examiner

*Primary Examiner* — San Htun
(74) *Attorney, Agent, or Firm* — Leydig, Voit & Mayer, Ltd.

(57) ABSTRACT

A method of controlling electronic data transmission between a mobile communication device located in a movable or moving vehicle and a mobile communication network includes obtaining at least one of location data and movement data relating to the current position of the vehicle. At least one of location data and movement data relating to a predicted position of the vehicle is calculated based on the at least one of location data and movement data relating to the current position of the vehicle. A current capacity situation of the mobile communication network is determined and a future capacity situation of the mobile communication network is predicted. Network and service parameters associated with a mobile communication system are dynamically adapted based on the current position and the predicted position of the vehicle and on the current capacity situation and the predicted future capacity situation of the mobile communication network.

21 Claims, 1 Drawing Sheet

METHOD AND SYSTEM FOR PROACTIVE AND DYNAMIC CROSS-LAYER OPTIMIZATION OF DATA TRANSMISSION TO VEHICLES

CROSS-REFERENCE TO PRIOR APPLICATION

Priority is claimed to European Patent Application No. EP 11 17 6576.4, filed on Aug. 4, 2011, the entire disclosure of which is hereby incorporated by reference herein.

FIELD

The invention provides a method and system of controlling and optimizing electronic data transmission between a mobile communication device located in a movable and/or moving vehicle and a mobile communication network.

BACKGROUND

The availability of state-of-the art communication, information and entertainment services such as telephony, eMail, internet access, music on demand, video on demand, online navigation, remote maintenance services, etc. in vehicles (private cars or public cars (i.e. taxis), trains or public transportation in general) is an increasing requirement from people travelling. An important prerequisite is data connectivity to the vehicles with data rates and QoS (Quality of Service) sufficient for the requested services.

For connectivity to moving vehicles a wireless connection is required, which can be provided by cellular mobile networks, such as GSM/GPRS/EDGE, UMTS/HSPA or LTE— or in some situation also by short range wireless networks, such as wireless local area networks (WLAN) or Bluetooth. For using information and entertainment services in vehicles, a connection to the required networks and service platforms can be established either directly by a mobile consumer device (e.g. smart phone, laptop, tablet) used in the vehicle or by a dedicated connectivity device integrated in the vehicle. Such approach is described, for example, in U.S. Pat. No. 7,558,603 B2.

However, due to nature of radio wave propagation, due to different load situations in the mobile networks, due to different technologies available for radio access and due to different network topologies, the availability and performance of the connectivity (in terms of data throughput, delay, etc.) may be very different for different positions of the moving vehicles. This may lead to the situation that ongoing services will be degraded (e.g. browsing or downloading will become very slow, streaming will be disturbed) or even be interrupted.

In current mobile communication networks, there is no awareness of the connectivity requirements of specific services (e.g. differentiation between real-time and non real-time services) at the Physical Layer and MAC Layer. In particular, there is no possibility to anticipate the future connectivity requirements of moving vehicles and to dynamically adapt and optimize network and service parameters in order to provide an optimized service in the vehicles.

SUMMARY

In an embodiment, the present invention provides a method of controlling electronic data transmission between a mobile communication device located in a movable or moving vehicle and a mobile communication network. At least one of location data and movement data relating to the current position of the vehicle is obtained. At least one of location data and movement data relating to a predicted position of the vehicle is calculated based on the at least one of location data and movement data relating to the current position of the vehicle. A current capacity situation of the mobile communication network is determined and a future capacity situation of the mobile communication network is predicted. Network and service parameters associated with a mobile communication system are dynamically adapted based on the current position and the predicted position of the vehicle and on the current capacity situation and the predicted future capacity situation of the mobile communication network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
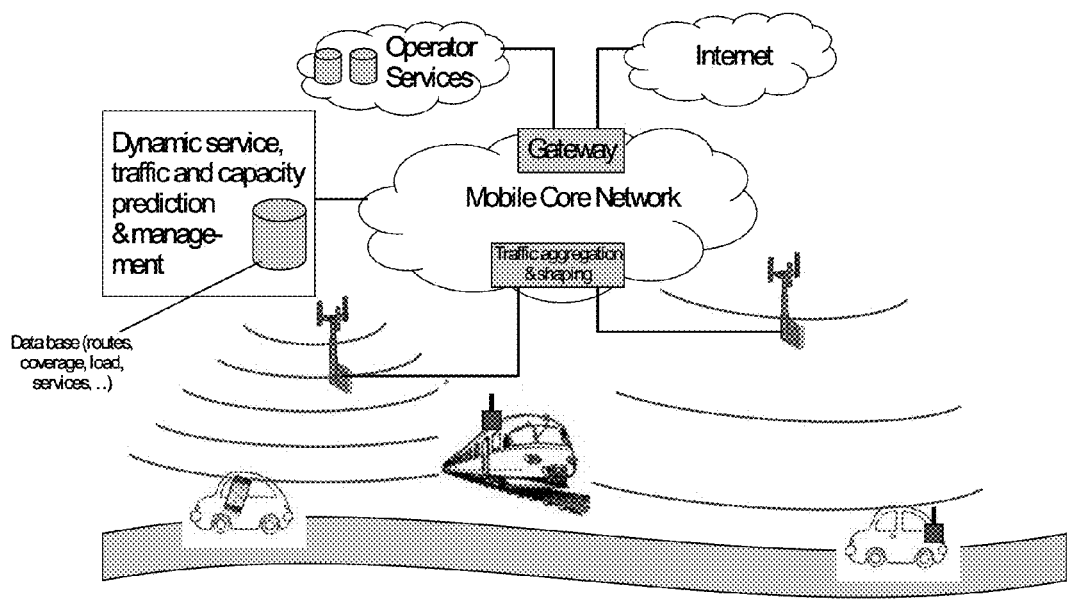
FIG. 1 shows an architecture view for the proactive and dynamic cross-layer optimization of data transmission to vehicles according to the invention.

According to a first aspect, the invention provides a method of controlling electronic data transmission between a mobile communication device located in a movable and/or moving vehicle and a mobile communication network, the method comprising the steps of:

a) obtaining location data and/or movement data relating to the current position of the vehicle;

b) calculating, based on the current position data, location and/or movement data relating to a predicted position of the vehicle;

c) determining the current and predicting the future capacity situation of the mobile communication network; and d) dynamically adapting network and service parameters associated with the mobile communication system based on the current and predicted position of the vehicle and on the current and predicted future capacity situation of the mobile communication network.

The term "movable vehicle" or "moving vehicle" according to the invention encompasses vehicles such as car, bus, truck, motorcycle, train, subway, river boats, i.e. vehicles whose movement is bound by given streets, rail tracks, or rivers, the course of which are known and typically fixed.

The term "mobile communication system" describes the system consisting of mobile devices, mobile networks and service platforms.

The vehicle location data may include at least vehicle position information data, for example position data indicating the current position of the vehicle. The vehicle movement data may include at least one of movement direction data and vehicle speed data.

According to an embodiment of the invention, the obtaining of location and/or movement data relating to the current position of the vehicle according to step (a) is based on information provided by the mobile communication device and/or provided by the vehicle. For example, step (a) is based on GPS information.

The calculation of location and/or movement data relating to a predicted position of the vehicle, based on the current position data, according to step (b) may be based on geographic information stored in a database on the network side. Alternatively, it may be based on geographic information stored in the vehicle or in the mobile device. Geographic information may include the course of a street or of a railway track the vehicle is currently using, i.e. a specific vehicle is moving on.

The determination of the current capacity situation of the mobile communication network and prediction of the future capacity situation of the mobile communication network according to step (c) may be performed on the basis of a determination of an average radio capacity along the route of the vehicle. The average radio capacity may be predicted based on radio-related parameters, such as the used radio technology, the used carrier frequency, the available frequency bandwidth, the used antenna parameters, and the radio coverage situation. Furthermore, the predicted average radio capacity may be stored in a data base and updated based on measurements collected by user terminals and transmitted back to the mobile network.

It is preferred that step (c) determines an instantaneous capacity of the mobile communication network available at a certain segment along the route of the vehicle. Furthermore, step (c) may predict the capacity of the mobile communication network required in the future at a certain segment along the route of the vehicle.

The dynamic adaptation of network parameters associated with the mobile communication network and service parameters associated with the requested services based on the predicted position of the vehicle and on the current and predicted future capacity situation of the mobile communication network according to step (d) may further be based on information about instantaneous communication services requested by the mobile communication device in the vehicle.

Furthermore, the dynamic adaptation according to step (d) may further be based on information about instantaneous communication services requested by other mobile communication devices located in the same vehicle, the same radio cell, or the surrounding radio cells.

It is also preferred that the dynamic adaptation according to step (d) is further based on information about current network system parameters and quality-of-service, QoS, parameters used and/or required for communication with the mobile communication device.

Step (d) of the method of an embodiment of the invention may also comprise dynamic buffering of the data to be downloaded to the mobile communication device, preferably if the data transmission is a streaming service. Step (d) of the method of the invention may also comprise dynamic resource allocation, preferably if the data transmission is a non time-critical service. Step (d) of the method of an embodiment of the invention may also comprise dynamic network selection if different communication networks are available in parallel. As a further option, step (d) comprises dynamic adaptation of radio system parameters. The invention also encompasses that step (d) comprises predictive and dynamic admission control. Step (d) may also comprise dynamic adaptation of QoS parameters.

The method according to an embodiment of the invention may be implemented on at least one of the device layer, the base station layer, the traffic aggregation layer, and the gateway layer.

According to an embodiment of the invention the connectivity between the mobile communication device in the vehicle and the mobile communication network is established directly by the mobile communication device. The connectivity between the mobile communication device and the mobile communication network may also be established through a dedicated connectivity device provided in the vehicle. In this case, the mobile communication device communicates with the dedicated connectivity device in the vehicle either wirelessly using a wireless broadband technology including at least one of a Wireless Local Area Networks, and Bluetooth connection, or via cable, for example using an Ethernet connection (see, e.g., EP-A-2 028 895).

According to a second aspect, the invention provides a system for controlling electronic data transmission between a mobile communication device located in a movable and/or moving vehicle and a mobile communication network, the system comprising a processing unit located in the mobile communication network, the processing unit configured to:
a) obtain location data and/or movement data relating to the current position of the vehicle;
b) calculate, based on the current position data, location and/or movement data relating to a predicted position of the vehicle;
c) determine the current and future radio capacity situation of the mobile communication network; and
d) dynamically adapt network and service parameters associated with the mobile communication system based on the current and predicted position of the vehicle and on the current and predicted future capacity situation of the mobile communication network.

In the system of the invention, the vehicle location data may include at least position information data, for example position data indicating the current position of the vehicle. The vehicle movement data may include at least one of movement direction data and vehicle speed data.

According to an embodiment of the invention, the processing unit configured to obtain location data and/or movement data relating to the current position of the vehicle may further be configured to base this on information provided by the mobile communication device and/or provided by the vehicle. As mentioned, GPS information may be used.

The calculation of location and/or movement data relating to a predicted position of the vehicle, based on the current position data may be based on geographic information stored in a database on the network side. Thus, the processing unit accesses such database in order to obtain the required geographical data. Alternatively, it may be based on geographic information stored in the vehicle or in the mobile device. Geographic information may include the course of a street or of a railway track the vehicle is currently using, i.e. a specific vehicle is moving on.

The determination of the current capacity situation of the mobile communication network and prediction of the future capacity situation of the mobile communication network according to (c) may be performed on the basis of a determination of an average radio capacity along the route of the vehicle. The average radio capacity may be predicted by the processing unit based on radio-related parameters, such as the used radio technology, the used carrier frequency, the available frequency bandwidth, the used antenna parameters, and the radio coverage situation. Furthermore, the predicted average radio capacity may be stored in a data base and updated based on measurements collected by user terminals and transmitted back to the mobile network.

It is preferred that the processing unit is configured to determine an instantaneous capacity of the mobile communication network available at a certain segment along the route of the vehicle. Furthermore, the processing unit may predict the capacity of the mobile communication network required in the future at a certain segment along the route of the vehicle.

The dynamic adaptation of network parameters and service parameters by the processing unit of the system may further be based on information about instantaneous communication services requested by the mobile communication device in the vehicle.

Furthermore, the dynamic adaptation may further be based on information about instantaneous communication services requested by other mobile communication devices located in the same vehicle, the same radio cell, or the surrounding radio cells.

It is also preferred that the dynamic adaptation is further based on information about current network system parameters and quality-of-service, QoS, parameters used and/or required for communication with the mobile communication device.

The processing unit is further preferably configured to perform dynamic buffering of the data to be downloaded to the mobile communication device, preferably if the data transmission is a streaming service. It may also provide dynamic resource allocation, preferably if the data transmission is a non time-critical service. As a further option, the processing unit may provide dynamic network selection if different communication networks are available in parallel. As a further option, it may be configured to provide dynamic adaptation of radio system parameters. The invention also encompasses that the processing unit provides predictive and dynamic admission control, and/or dynamic adaptation of QoS parameters.

The processing unit may be implemented on at least one of the device layer, the base station layer, the traffic aggregation layer, and the gateway layer.

According to the system of an embodiment of the invention the connectivity between the mobile communication device and the mobile communication network is established directly by the mobile communication device. The connectivity between the mobile communication device and the mobile communication network may also be established through a dedicated connectivity device provided in the vehicle. In this case, the mobile communication device communicates with the dedicated connectivity device wirelessly using a wireless broadband technology including at least one of a Wireless Local Area Networks, and Bluetooth connection, or via cable, for example using an Ethernet connection.

It is encompassed by an embodiment of the invention that the mobile communication device includes at least one of a laptop, a smart phone, a tablet personal computer, a PDA, and a mobile phone.

The mobile communication network may include at least one of GSM/GPRS/EDGE, UMTS/HSPA, LTE and WLAN network.

As mentioned above, in current mobile networks, there is no awareness of the connectivity requirements of specific services. In particular, there is no possibility to anticipate the future connectivity requirements of moving vehicles and to dynamically adapt and optimize network and service parameters in order to provide an optimized service in the vehicles.

The invention, according to an embodiment, overcomes these shortcomings by intelligently combining different types of information, such as:
  current position, movement direction and speed of a specific vehicles,
  course of streets or railway tracks a specific vehicle is moving,
  average coverage and capacity along the streets or railway tracks,
  instantaneous load situation in the radio cells covering the route of a certain vehicle,
  current services used by a certain device in a vehicle,
  current system parameters and QoS parameters used for a connection to a certain device,
  connectivity requirements from currently used services.

These pieces of information are available in either the vehicles, the mobile devices or in different components of the mobile network and/or service platform, and are used according to an embodiment of the invention to optimize the connectivity and service provisioning to vehicles.

Thus, an embodiment of the invention performs a proactive and dynamic end-to-end connectivity management and optimization by prediction of resource and QoS requirements of the users in the vehicles and to perform a dynamic, user-, network- and service-overarching adaptation of network parameters (e.g. resource allocation and resource prioritization, radio parameters, QoS parameters) and service parameters (e.g. resolution, time of delivery, . . . ).

In the following, a first example will be described. The example relates to an optimization of a streaming service, such as music on demand.

The download of data for a streaming services to the device of the customer can be controlled according to an embodiment of the invention, for example, in such a way that sufficient data can be downloaded in advance to the user device and buffered in the device at such sections of his course where coverage is good in order to bridge other sections with known poor coverage and/or high capacity demands in order to avoid interruptions of the service. Alternatively or additionally, the quality parameters of the music streaming can be dynamically adapted according to the anticipated resources for data transmission. Alternatively or additionally, the resource allocation and prioritization in the network can be performed in such a way that services with no real-time requirements (e.g. file downloads) are delayed if capacity shortages will occur at a current section of the route or will be anticipated for route sections the vehicle will pass in the future.

Another example relates to the optimization of a video conference session. In such a case, the availability of networks and capacities is predicted for the duration of the video conference. This network is selected which can provide the service for the whole duration, and quality parameters are set in such a way that they can be kept for the whole session (although at the set-up of the session networks with higher capacity, e.g. LTE might be available). Alternatively or additionally, handover parameters and antenna parameters are adjusted in such a way that available capacity for the video conference session is maximized for a street section with capacity shortages (e.g. with EDGE coverage only) and other services are kept in adjacent radio cells as long as possible. Alternatively or additionally, other services without real-time requirements (e.g. downloads) are treated in such a way that handover into capacity limited cells is avoided (e.g. if it can be predicted that for high speed vehicles after a short outage another cell with sufficient capacity will be reached).

The advantages of the invention are better utilization of available network capacities and avoidance of overload situations, along with higher customer satisfaction.

The invention will now be described with reference to an exemplary embodiment as shown in the figures.

FIG. 1 illustrates the basic principle of the invention according to an embodiment. Users in vehicles such as cars or trains want to use different services while on the move. FIG. 1 shows, as an example, two cars and a train having users on board who want to communicate through mobile communication devices. Via base stations, a connection is established with a mobile core network. The mobile core network provides functionality for traffic aggregation and shaping. Furthermore, the mobile core network provides a gateway to the internet, for example, and to operator services.

Furthermore, FIG. 1 shows a dynamic traffic and capacity prediction and management unit as an exemplary processing unit embodying the present invention. This unit may comprise storage units, such as a database, storing information about routes (e.g., streets, railway tracks), radio coverage, load data, and service data.

In principle, there are two basic options how the communication to and from the mobile communication devices can be performed. For one, a mobile communication device such as a laptop, smart phone or a tablet PC is used. In that case service usage is similar to other mobile scenarios. The connectivity to the mobile network(s) is established directly by the mobile device. Alternatively, a dedicated connectivity device is integrated in the vehicle. In this case, the connection to the external networks can be established via different dedicated modems (e.g. for 2G, 3G, LTE or WLAN networks) and with a mobility management solution. In this respect, an embodiment of the invention encompasses a seamless and controlled selection of different networks, including cellular and WLAN, and a combination of more than one connection is also envisaged. The user can consume his services by using his portable devices (e.g. laptop, smart phone, tablet PC) which can be connected to the connectivity device via Ethernet cable or via a short range wireless technology such as WLAN or Bluetooth. Alternatively, services could be consumed by using devices integrated in the vehicle, such as head units, displays or audio systems in cars.

In contrast to mobile usage scenarios in general where the location and the movement of users is generally random and cannot be predicted, for service usage in vehicles the positions and the movement are strictly limited to streets or railways and are, therefore, predictable. Movement and/or location data, i.e. information from the vehicle such as its position and its speed (obtained, for example, by GPS or derived from the schedule of the train), its direction and its route (e.g. planned and programmed in a navigation system) in combination with known maps of roads or railway tracks can be used to support the location and/or movement prediction. Based on this information a distinction between mobile users being in vehicles and other mobile users can be made according to an embodiment of the invention.

The combination of the predicted location of the vehicle with various other network and service parameters and the instantaneous reaction to the inherent dynamics in the network are the key of the described invention. This functionality is illustrated by the block "Dynamic service, traffic and capacity prediction & management" in FIG. 1.

One type of information for the dynamic service and capacity management is the capacity situation of the network, e.g., radio capacity situation, along streets or railways. The capacity information can be split into two components: the average capacity along streets or railway tracks, or the instantaneous capacity situation.

The average capacity available in a certain segment of a street or railway track (e.g. given in Mbit/s per km of stretch) depends on various radio-related parameters, such as the types of mobile radio technology available for coverage (e.g. GPRS, HSPA or LTE), the used frequency bandwidth (e.g. 5 MHz, 10 MHz or 20 MHz for LTE), the used antenna parameters (e.g. number of antennas, antenna tilt) and the radio coverage situation (e.g. given in average received power level, delay spread). Based on such parameters the average capacity situation can be predicted and can be stored in a data base for all streets or railway tracks.

The capacity estimates are preferably refined and updated based on measurements collected by user terminals and transmitted to the mobile network.

On the other hand, the instantaneous capacity available at a certain segment of a street or railway track depends on the instantaneous load situation (i.e. capacity already used or occupied) and the available overall capacity. The instantaneous capacity is highly variable since the load situation as well as the coverage situation can change quickly.

The instantaneous load can be derived from system parameters available in the base stations covering the considered route segment and/or from other network components.

Another category of formation for the dynamic service and capacity management according to an embodiment of the invention is the information about the instantaneous requested services from the various devices in the vehicles. From the requested services, different kinds of requirements for the connectivity can be derived. The requested services can be categorized according to different criteria, e.g.:

Distinction between real-time and non real-time services
Average and peak data rate requirements
Delay and delay jitter requirements
Is buffering possible?
QoS class(es) related to the service (if the existing system performs a mapping of services to pre-defined QoS classes)

From the known requested services, their characteristics and requested resources a predictive allocation and optimization of the overall available resources can be facilitated.

The combination and processing of all this information allows for a variety of possible functions of the dynamic service, traffic and capacity prediction & management:

For example, an embodiment of the invention comprises dynamic buffering. For streaming services, sufficient data is downloaded in advance to the user device and buffered in the device at such sections of his course where sufficient coverage and/or capacity is available in order to bridge other sections with known poor coverage and/or high capacity demands in order to avoid interruptions of the service.

Furthermore, according to another preferred aspect, dynamic resource allocation (e.g. throughput control) is provided by an embodiment of the invention. For non time-critical services such as browsing, E-Mail access or downloading the speed of data transmission to the various devices in the vehicles is controlled in such a way that sufficient capacity is available for services with real-time requirements or certain minimum bandwidth requirements. This can include the option to provide ongoing data sessions (e.g. downloads) with higher speed than assigned to the related service class on average in order to complete the data transmission before capacity shortages will occur (e.g. because of know poor coverage at certain sections of a street or railway track or because of leaving coverage area of a high capacity radio network).

Another option provided by an embodiment of the invention is dynamic network selection. There may be sections of streets or railway tracks where different mobile networks are available in parallel (e.g. 2G and 3G networks). Preferably, in an embodiment, the invention decides which network shall be used for which requested services in order to balance the load between the available networks and to avoid capacity shortages.

Another aspect is dynamic adaptation of radio system parameters. The capacity available in a radio cell and for a distinct user is controlled by different radio system parameters, such as a resource allocation mechanisms in the scheduler at the base station, handover parameters, transmit power of the base station and the mobile device, antenna orientation, etc. In state-of-the art mobile radio networks, these parameters are preconfigured during the radio network planning and deployment process and will not be changed during operation of the mobile networks. Based on this preferred embodiment of the invention, the radio parameters are dynamically adapted. As examples, the following adaptations can be performed:

- Change of priorities in the schedulers at the base stations in order to provide sufficient resources to the users in the vehicles. This mechanism will be controlled by the dynamic service, traffic and capacity prediction and management in a base station overarching manner and may overwrite the scheduling priorities and mechanism which are applied normally under the control of a single base station ("meta scheduling").
- Change of handover parameters in order to balance load between adjacent radio cells covering a street or a railway track.
- Adaptation of transmit power of these base station sectors which are (for a certain instance in time) covering segments of streets or railway tracks where capacity shortages are anticipated which can be mitigated by increased transmit power.
- Dynamic change of antenna orientations or antenna tilts in order to improve radio coverage for segments of streets or railway tracks where capacity shortages are anticipated.

The invention, in an embodiment, further encompasses predictive and dynamic admission control. If users in vehicles want to use services requiring capacity not available at upcoming segments of streets or railway tracks, a predictive and dynamic admission control is introduced, informing the user that a requested service (e.g. streaming) will not be available for the expected duration of the service (e.g. duration of an audio or video clip)—although there may be sufficient bandwidth at the time where the service is being requested. Other options can be to inform the user (and eventually to ask for his permission) that the service is only available in lower quality or that the service will be available after waiting a certain time (i.e. after the vehicle is reaching a street or railway segment where the coverage and/or capacity situation is sufficient to allow the requested service).

Finally, an embodiment of the invention preferably encompasses dynamic adaptation of QoS parameters. The QoS parameters (e.g. quality of audio or video streams, data speeds allocated to browsing or download services) will be adapted in the network in such a way that all services requested by the users can be provided in an optimized way.

These described mechanisms are preferably implemented by a client-server solution with hierarchical traffic management mechanisms in heterogeneous, multi-technology mobile networks.

These described mechanisms are not necessarily required in combination. Rather, an embodiment of the invention encompasses that sub-sets of these mechanisms are implemented or even just a single one thereof is implemented.

Figure 2:
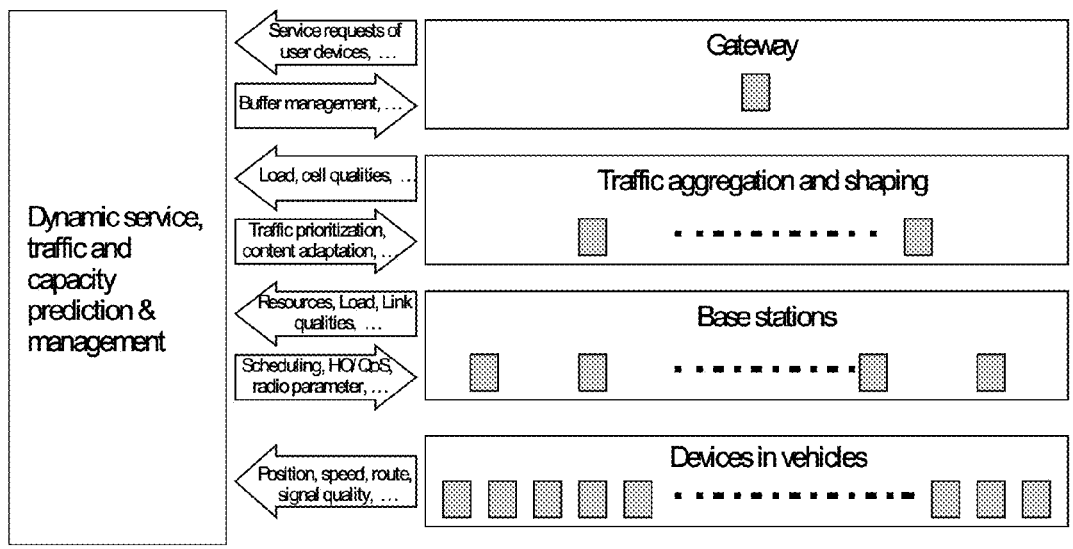
FIG. 2 shows a functional block diagram for the proactive and dynamic cross-layer optimization of data transmission to vehicles giving examples for the information flow.

In FIG. 2, a functional block diagram of an embodiment of the invention is shown. In particular, FIG. 2 shows examples for different kinds of information exchanged between the dynamic service, traffic and capacity prediction and management unit and the devices or different entities of the network, respectively. FIG. 2 illustrates that the optimizations according to an embodiment of the invention can be performed at different layers of the network hierarchy. The layers are for example device layer, base station layer (e.g. Radio Access Network, RAN), traffic aggregation layer (as part of mobile Core Network, CN), or gateway layer (e.g. GGSN in 2G or 3G networks, P-GW in LTE EPC (Evolved Packet Core)).

The described optimizations can be performed at each layer individually or in parallel across the different layers.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

List of Acronyms
BS Base Station
CN Core Network
EPC Evolved Packet Core
GGSN Gateway GPRS Support Node
GSM Global System for Mobile Communications
LTE Long-Term Evolution
MAC Medium Access Control
MS Mobile Station
P-GM Packet Gateway
RAN Radio Access Network
UMTS Universal Mobile Telecommunication System

What is claimed is:

1. A method of controlling electronic data transmission for a mobile communication device located in a movable or moving vehicle, the method comprising:
    a) obtaining at least one of location data and movement data relating to the vehicle;
    b) determining, based on the at least one of location data and movement data, a predicted position of the vehicle;
    c) determining a capacity situation corresponding to a mobile communication network to which the mobile communication device is currently connected, and determining, based on the predicted position of the vehicle, a future mobile coverage situation for the vehicle corresponding to the predicted position of the vehicle; and
    d) dynamically adapting network and service parameters associated with an ongoing service being provided to the mobile communication device by the mobile communication network to which the mobile communication device is currently connected based on the mobile coverage situation for the vehicle corresponding to the predicted position of the vehicle;
    wherein step (c) includes determining an average radio capacity along a route of the vehicle, wherein the average radio capacity is stored in a database and updated based on measurements collected by user terminals and transmitted back to the mobile communication network;

wherein step (d) is performed based on information about instantaneous communication services requested by other mobile; and wherein the method further comprises:

establishing connectivity between the mobile communication device and the mobile communication network through a local connectivity device provided in the vehicle.

2. The method of claim 1, wherein the location data includes at least position information data.

3. The method of claim 1, wherein the movement data includes at least one of movement direction data and vehicle speed data.

4. The method of claim 1, wherein step (a) is performed based on information provided by at least one of the mobile communication device and the vehicle.

5. The method of claim 1, wherein step (b) is performed based on geographic information stored in a database on at least one of a network side, the vehicle and the mobile device.

6. The method of claim 1, wherein the average radio capacity is predicted based on radio-related parameters including at least one of a used radio technology, a used carrier frequency, an available frequency bandwidth, used antenna parameters, and a radio coverage situation.

7. The method of claim 1, wherein step (c) includes determining an instantaneous capacity available at a certain segment along the route of the vehicle.

8. The method of claim 1, wherein step (c) includes predicting a capacity that will be required at a certain segment along a route of the vehicle.

9. The method of claim 1, wherein step (d) is performed based on information about instantaneous communication services requested by the mobile communication device in the vehicle.

10. The method of claim 1, wherein step (d) is performed based on information about current network system parameters and quality-of-service (QoS) parameters used or required for communication with the mobile communication device.

11. The method claim 1, wherein step (d) includes dynamically buffering data to be downloaded to the mobile communication device.

12. The method claim 11, wherein step (d) includes dynamically buffering data to be downloaded to the mobile communication device and provided in a data transmission that is a streaming service.

13. The method claim 1, wherein step (d) includes performing dynamic resource allocation.

14. The method of claim 12, wherein step (d) includes dynamic resource allocation in a data transmission that is a non-time-critical service.

15. The method of claim 1, wherein step (d) includes performing dynamic network selection of different communication networks that are available in parallel.

16. The method of claim 1, wherein step (d) includes performing a dynamic adaptation of radio system parameters.

17. The method of claim 1, wherein step (d) includes performing predictive and dynamic admission control.

18. The method of claim 1, wherein step (d) includes performing dynamic adaptation of quality-of-service (QoS) parameters.

19. The method of claim 1, further comprising establishing connectivity between the mobile communication device and the mobile communication network directly by the mobile communication device.

20. The method of claim 1, wherein the mobile communication device communicates with the local connectivity device wirelessly using a wireless broadband technology including at least one of a Wireless Local Area Network and Bluetooth.

21. A non-transitory processor-readable medium having processor-executable instructions stored thereon for controlling electronic data transmission for a mobile communication device located in a movable or moving vehicle, the processor-executable instructions, when executed by a processor, being configured to facilitate performance of the following steps:

a) obtaining at least one of location data and movement data relating to the vehicle;

b) determining, based on the at least one of location data and movement data, a predicted position of the vehicle;

c) determining a capacity situation corresponding to a mobile communication network to which the mobile communication device is currently connected, and determining, based on the predicted position of the vehicle, a future mobile coverage situation for the vehicle corresponding to the predicted position of the vehicle; and d) dynamically adapting network and service parameters associated with an ongoing service being provided to the mobile communication device by the mobile communication network to which the mobile communication device is currently connected based on the mobile coverage situation for the vehicle corresponding to the predicted position of the vehicle;

wherein step (c) includes determining an average radio capacity along a route of the vehicle, wherein the average radio capacity is stored in a database and updated based on measurements collected by user terminals and transmitted back to the mobile communication network;

wherein step (d) is performed based on information about instantaneous communication services requested by other mobile; and wherein the steps further include:

establishing connectivity between the mobile communication device and the mobile communication network through a local connectivity device provided in the vehicle.

* * * * *